Dec. 30, 1947. L. W. T. CUMMINGS 2,433,345
CYCLIC CATALYTIC PROCESS
Filed Dec. 31, 1940 4 Sheets-Sheet 2

INVENTOR
Leland W. T. Cummings
BY
Ira L. Nickerson
ATTORNEY

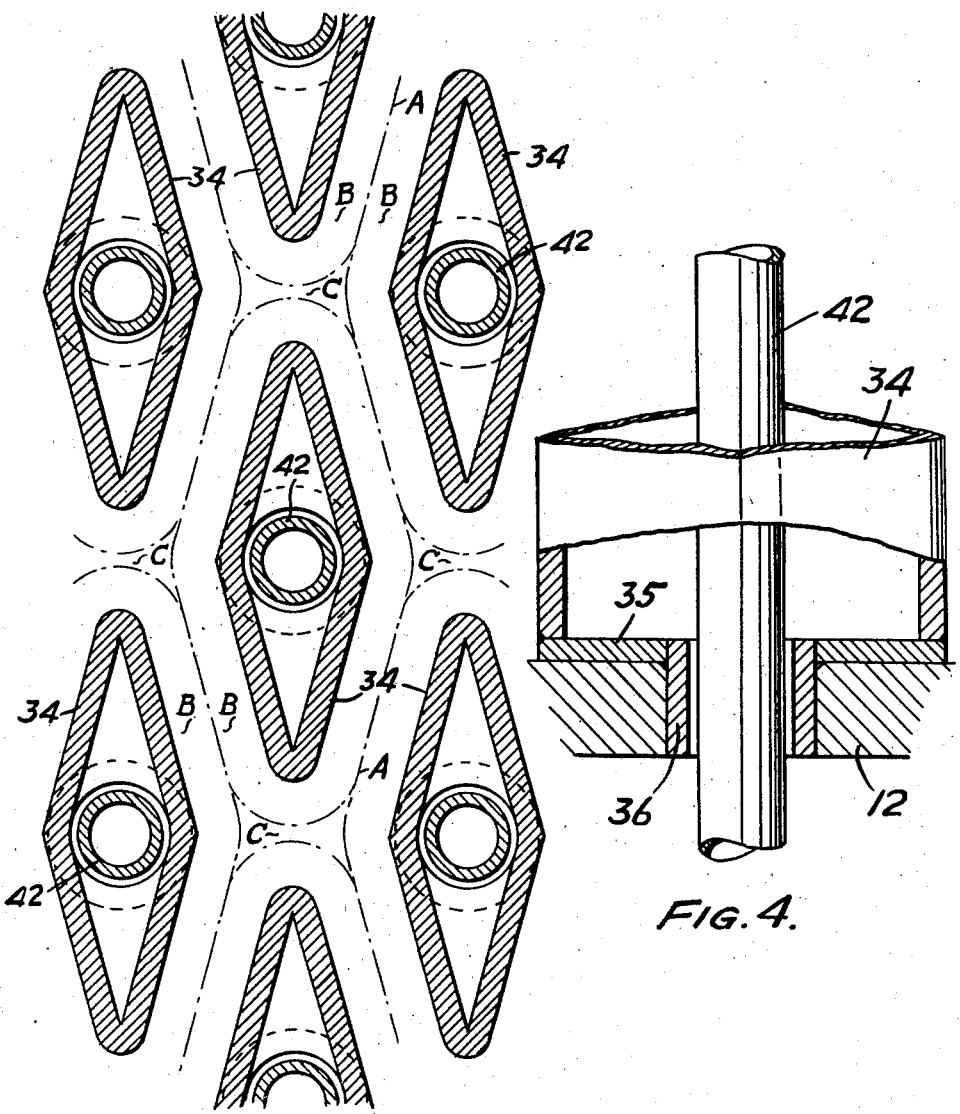

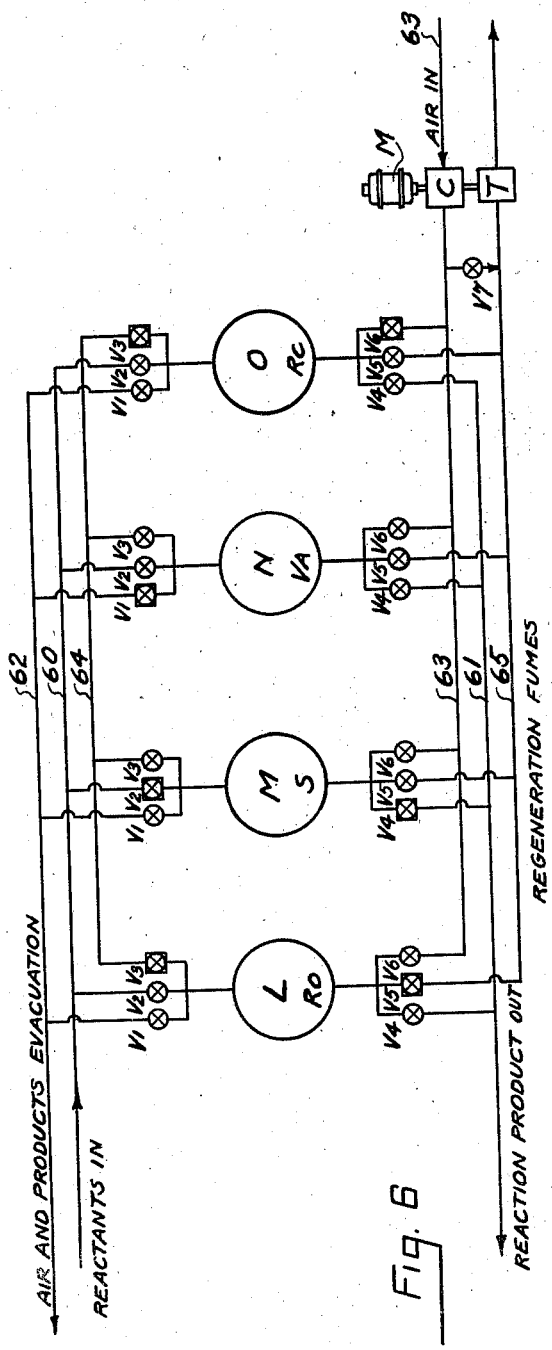
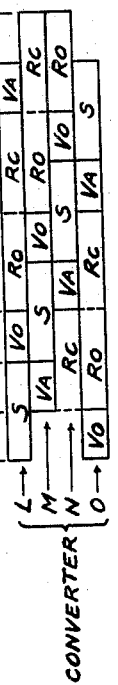

Patented Dec. 30, 1947

2,433,345

UNITED STATES PATENT OFFICE 2,433,345

CYCLIC CATALYTIC PROCESS

Leland W. T. Cummings, Wyncote, Pa., assignor, by mesne assignments, to Houdry Process Corporation, Wilmington, Del., a corporation of Delaware Application December 31, 1940, Serial No. 372,615

1 Claim. (Cl. 23—1)

This invention relates to a method and apparatus for heat transfer, and particularly to a method and apparatus for effecting heat transfer within a case in which catalytic reactions are being carried out.

While the invention is more generally applicable, its objects may be best understood by reference to the catalytic cracking of hydrocarbons wherein oil vapors are passed in contact with a porous adsorptive catalyst and a deposit of carbon or coke is formed upon the contact mass necessitating, after a period of operation, regeneration by oxidation of the deposit. The cracking reaction is endothermic and in order to maintain a proper yield of products it is necessary to add heat to the reacting materials to make up that lost in the reaction.

When lighter products such as heavy naphtha or gas oil are being cracked, it is possible to superheat these above the desired cracking temperature without pyrolytically cracking them during the heating period. However, when heavier products are cracked, it is usually impossible to add any substantial degree of superheat above the desired cracking temperature without pyrolytically cracking the vapors, which is an undesirable result, the cracking desirably taking place only in the reaction induced by the catalyst. Because of the above circumstances, it is necessary to maintain the temperature of the reaction by adding heat directly to the catalytic mass rather than preliminarily to the vapors.

The removal of the carbon which contaminates the catalyst after a period of cracking is highly exothermic and consists of an oxidation closely approaching an active combustion. Inasmuch as the activity of the catalyst may be impaired and in some instances even completely destroyed if heated much above about 1150° F., it is necessary to provide for rapid removal from the catalyst of the heat generated by the oxidation.

Both the addition of the heat to and the removal of heat from a porous adsorptive catalyst of the clay type is rendered difficult in that the catalyst is itself often a poor conductor of heat not only because of the fact that it may consist of a relatively non-conducting material, but because of the voids between the particles of the catalyst which form gas-containing spaces through which the heat transfer rate is very low.

Heretofore it has been proposed to add heat to and remove heat from a catalytic mass by means of circular tubes arranged within the catalytic mass. Both plain tubes and finned tubes have been provided, but in some instances such arrangements have not been entirely satisfactory for various reasons. The reacting fluids are usually supplied through perforated tubes or similar arrangements, and the use of plain or finned tubes tends to produce pockets of catalyst which are at times not reached in the normal flow of the reacting fluids, depending upon the arrangement of the inlet and outlet passages. In general, this causes no difficulty if confined to the on-stream or cracking portion of the cycle, but if it occurs only during the regeneration portion of the cycle the oxidizing medium does not reach all parts of the mass uniformly and non-uniform regeneration occurs. When certain portions of a porous catalytic mass are not properly regenerated, these portions containing deposited carbon gradually enlarge after a number of cycles, thereby cutting down the yield during the on-stream portion of the cycle until excessive regeneration times are necessary in an attempt to remove the deposits from the dead spaces. The cycle of operation is thus upset, since it is desirable to have a sufficient number of chambers so that a constant supply of hydrocarbon vapors may be continuously cracked.

In accordance with the present invention, it has been found that if the distance between any two heat exchange surfaces within a catalytic mass is carefully controlled, and that if the reacting vapors are caused to follow a streamlined path having no dead pockets adjacent but outside the path, the reaction, whether on-stream or regenerative, is greatly improved. Preferably, the heat exchange elements are of a diamond shape, properly interspersed throughout the catalytic mass to form paths having cross-sectional widths of not more than .75 to 1.00 inch. Under such conditions, substantially ideal results are secured during both the on-stream and regeneration portions of the cracking cycle.

One object of the invention may be stated to be the provision of a catalytic mass so arranged that a flow of vapors occurs therethrough without possible entrapment in pockets outside the normal path of flow, with the accompanying provision of heat exchange elements within the mass to remove heat uniformly therefrom or to add heat uniformly thereto.

The heat exchange elements in accordance with the invention may be of two types, each type presenting exteriorly a diamond-shaped cross-section. In one case, these heat exchange elements may be hollow tubes through which a heat exchange liquid is caused to circulate to remove heat during the occurrence of exothermic reactions and to add heat during the occurrence of endothermic reactions. In the case of hollow tubes containing circulating liquid, provision is made for securing a more uniform temperature throughout the extent of each of such tubes. This latter is accomplished by causing the liquid to enter each such tube through an inner tube extending substantially the length of the diamond-shaped tube and then causing it to flow reversely through the diamond-shaped tube outside the inner tube. Heat exchange then takes place through the wall of such inner tube, producing a more uniform temperature of the heat exchange liquid and consequently of the outer tube.

In another embodiment of the invention, the heat exchange elements of diamond-shaped cross-section are not tubular, but are of solid metal, such as iron, being of such mass and being distributed in sufficient numbers through the catalytic mass as to absorb substantial amounts of heat and prevent great temperature rise during regeneration periods and to give up substantial amounts of heat and prevent substantial drop of temperature during on-stream periods.

The above and subsidiary objects of the invention will be apparent from the following description read in conjunction with the accompanying drawings in which:

Figure 3 is an enlarged horizontal section showing details of heat exchange tubes utilized in accordance with the present invention and showing also diagrammatically some of the considerations involved in the arrangement of these tubes;

Figure 4 is a fragmentary vertical section showing in detail the connection of a diamond-shaped tube to a supporting tube sheet.

Figure 6 is a partially diagrammatic view showing one arrangement of a plurality of converters with various valves and ducts for controlling the cycle of on-stream and regeneration reactions according to the present invention.

Fig. 7 shows an illustrative manner in which to relate the cycle of operation in the several converters to each other.

The diamond-shaped heat exchange elements of either tubular or solid form used in accordance with the present invention may be included in various types of catalyst cases, but for purposes of illustration are shown as utilized in the type of case forming the subject-matter of the application of Walter Samans, Serial No. 219,568, filed July 16, 1938, for Heat exchange apparatus, which has matured into Patent No. 2,261,293.

Figure 1:
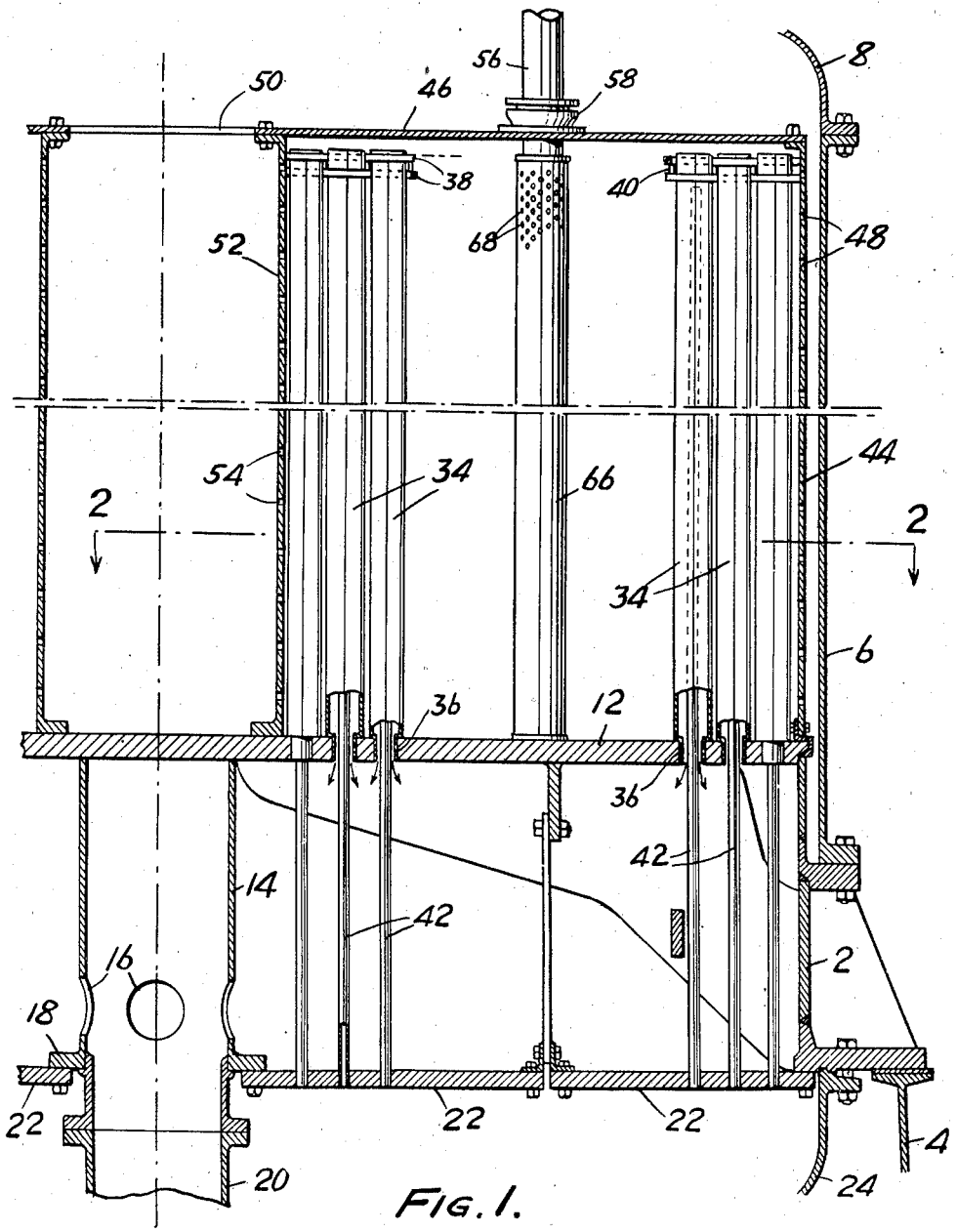
Figure 1 is a vertical fragmentary section showing the general structural details of an apparatus for a catalytic process of the type generally indicated above.
Figures 2, 5:
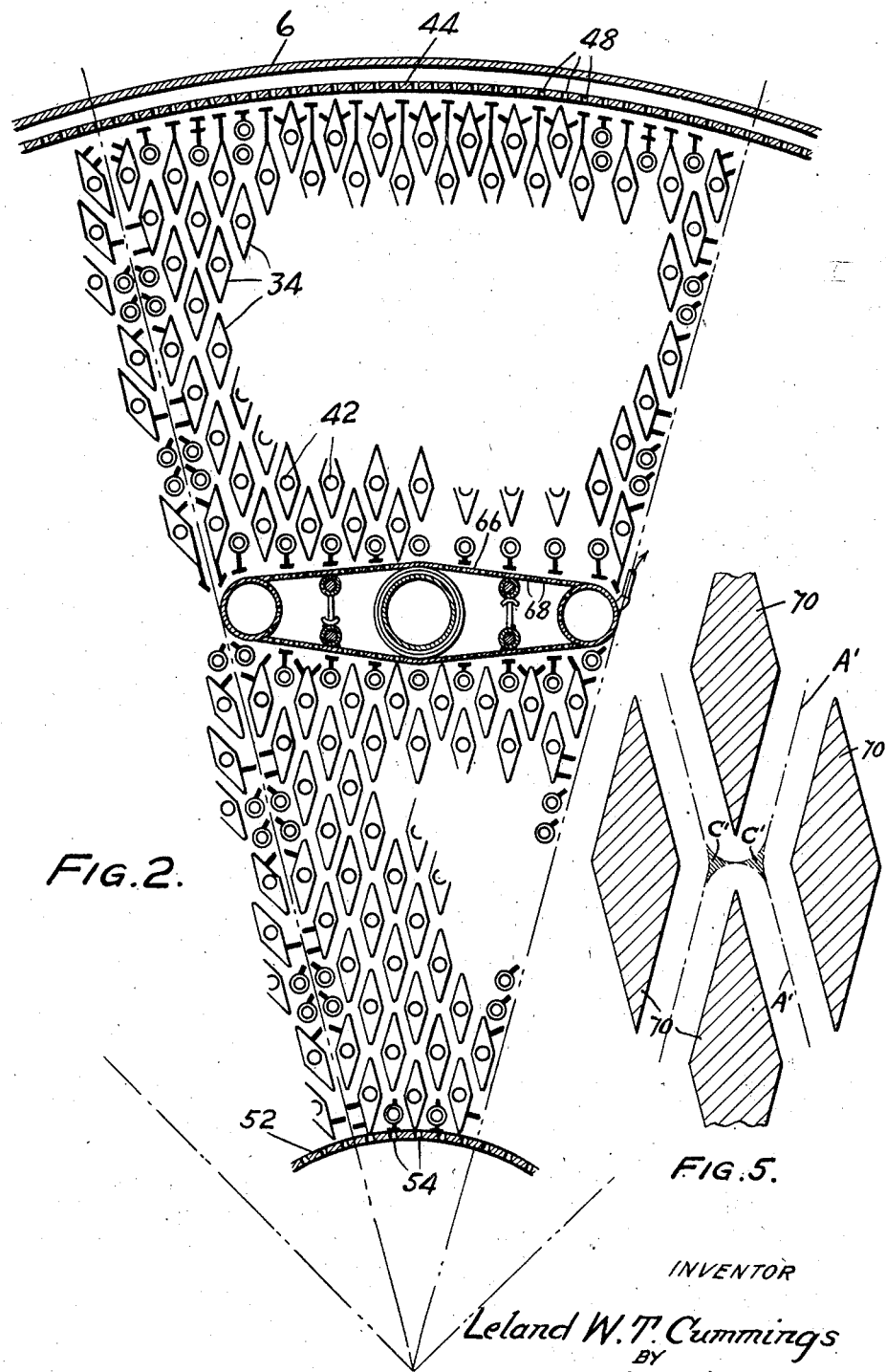
Figure 2 is a fragmentary horizontal section through the same taken, for example, on the plane the trace of which is indicated at 2—2 in Figure 1.
Figure 5 is a sectional view similar to Figure 3, but illustrating the use of solid metal heat exchange elements.

Figures 1 and 2 disclose in general outline, the type of apparatus shown in said application, this apparatus being designed to provide flow of reacting materials through the catalytic mass transversely to the extent of the diamond-shaped heat exchange elements.

Referring first to Figures 1 and 2, the apparatus may comprise an annular supporting structure indicated at 2 arranged to rest upon suitable beams indicated at 4, providing a support and raising the bottom of the heat exchange apparatus off the level of the ground. Bolted to the top of the supporting structure 2 is an outer shell 6 surmounted by the cap 8 bolted to it and provided with a central outlet for the fluid passing through the treating zone of the apparatus. Also secured to an upwardly extending flange of the supporting structure 2 is a tube sheet 12 to the bottom of which is welded at the imperforate central portion thereof a downwardly extending discharge tube 14 provided with entrance openings 16 having a downward extension 20 joined to a lower cover member 24 which is bolted to the supporting structure 2. The extension 20 is joined to a suitable discharge line.

Flanges 18 join the tube 14 with segmental plates 22 which are in turn joined to similar plates through the medium of angle members supported by bars from the tube sheet 12. All of the various parts just mentioned are bolted together with suitable interposed packing so that they may be dismantled for cleaning purposes. The cover 24 is provided with suitable inlet passages (not shown) through which heat exchange medium may be introduced.

The tube sheet 12 has apertures therein receiving circular portions 36 of the outer diamond-shaped tubular members 34 of the heat exchange elements. Each circular portion 36 is preferably secured to the tubular member 34 by being welded in a plate 35 which is in turn welded to the member 34, as indicated in Fig. 4. The upper ends of the tubular members 34 are held in proper spaced relationship by means of a grating arrangement indicated at 38 comprising upper and lower heavy rod elements vertically spaced by means of upright rods 40 welded between them. The spaces left by this grating arrangement are, in general, diamond-shaped, and arranged to receive the upper ends of the tubular members 34. The grating permits catalyst to be filled into the case through it and top openings (not shown) to fill the spaces between the tubes.

Extending upwardly within the members 34 to substantially their upper closed ends are tubes 42 supported in openings in the plates 22 which form tube sheets therefor. By reason of this arrangement, the heat exchange medium, desirably a liquid, is caused to enter the cover member 24, thence pass upwardly through the tubes 42 into the upper closed ends of the tubular members 34, flowing downwardly within these tubular members 34 about the tubes 42 and discharging into the closed chamber provided between the plates 22 and the tube sheet 12. Thence discharge takes place through the openings 16 and the extension 20 into the discharge piping.

Surmounting the tube sheet 12 and bolted thereto is a shell 44 provided with a removable top 46 having a central aperture 50. Located below the top 46 and surrounding the aperture 50 is a cylindrical tube 52. The cylindrical outer wall of the shell 44 is perforated as indicated at 48, the same being true as indicated at 54 in the case of the tube 52. The annular space between the tube 52 and the outer wall 44 of the shell is the reaction zone into which the tubular members 34 extend. In this zone between the tubular members 34 there is located the catalyst in granular form. Through this reaction zone the reacting materials may flow through the openings 48 and 54 into the clearance space between the wall 44 and wall 6 and the tube 52, respectively, and thence into the cover 8 to be discharged through the outlet.

Inflow is provided through the cover 8 by a series of inflow tubes 56 suitably packed in the cover and also packed through the top 46 in the shell as indicated at 58. These tubes communicate with the interior of hollow members indicated at 66 in Figure 1, and are provided with openings 68 as indicated therein and in Figure 2. Preferably, the arrangement is such that flow of the incoming fluids takes place to the bottom through an inner tube in each instance and thence upwardly to secure more uniform temperature distribution. Such arrangement, however, forms no part of the present invention, and reference may be made to said Samans application for details. For the purpose of the present application it may only be remarked that substantially uniform distribution of the fluid, either oil vapors or the like, or regeneration gas, takes place through the openings 68 into the catalyst space and thence to the outlet previously described.

The arrangement of the diamond-shaped tubes to provide substantially direct stream-lined flow without dead spaces either to the openings 48 or to the openings 54 is illustrated best in Fig. 2. From this figure it will be noted that the case may be regarded as subdivided into a number of segments in each of which there is an array of the diamond-shaped tubes of such nature that the flowing fluids will take a substantially direct but zigzag course from the entrance member 66 to the outlet openings. Along the junctions of the segments the tubes may be provided with fins to secure more uniform heat distribution, since it is difficult to arrange the diamond-shaped tubes so as to completely fill these boundaries. Tubes of circular section may also be provided. In general, however, the major area of the apparatus is filled with diamond-shaped tubes arranged in a predetermined design as indicated below.

The considerations involved in the use of diamond-shaped heat exchange tubes will be best understood from consideration of Figure 3, which shows a portion of the array of these tubes in enlarged section. To secure maximum heat exchange for a given quantity of liquid and with a compact arrangement as a whole it is desirable that the heat transfer surface displace a minimum of catalyst volume or, in other words, the heat transfer tube should have as high a surface to volume ratio as is practical. At the same time it is desirable to secure as direct flow as possible without dead spaces which might accumulate deposits as outlined above.

A further consideration is that no portion of the catalyst should be substantially more than a certain small distance from the heat exchange surface to avoid either abnormally high temperature or abnormally low temperature in any portion of the catalyst which, as mentioned above, is often a poor conductor of heat. It is found, for example, that for best results no portion of such a catalyst should be more than about .38 to .50 inch from a heat exchange surface. This result must be secured, however, with a maximum size of passage for flow and consequently the result should not be achieved by causing the heat exchange surfaces to be abnormally close together.

The solution of all of these problems is found in the use of the diamond-shaped tubes in the type of array indicated in Fig. 3. The tubes are preferably of such type that the longest dimension is several times the shorter dimension, the proportions being preferably about as illustrated. Assuming that the tubes are so arranged that their plane surfaces are about .75 inch apart, there can be drawn surfaces as indicated at A which are spaced .375 inch from the outside of the tubes. Under these conditions, it will be obvious that in the regions B between these surfaces and the tubes all portions of the catalyst will be no more than .375 inch from the tubes. This leaves only the regions indicated at C in which the catalyst may be more than .375 inch from the tubes. In these regions, however, it will be obvious that no catalyst will be more distant from a tube than about .50 inch and this spacing may be cut down by bringing the tubes slightly closer together. If, as a standard, however, it is assumed that no portion of the catalyst is desirably more than .375 inch from a tube, the arrangement illustrated in Fig. 3 is quite satisfactory, since the slightly greater spacings occurring in the regions C are perfectly consistent with proper operation, particularly since in these regions C there is in general a maximum degree of penetration by the flowing gases or vapors. In brief, it may be said that the arrangement of the diamond-shaped heat exchange elements defines substantially uniform catalyst paths across the reaction chamber in which virtually all portions thereof are not more than half the spacing between the side walls of the elements.

The tubes 42 are related in size to the outer tubes 34 about as illustrated in Fig. 3, i. e., they are as large as possible consistent with clearance between the inner wall of each outer tube and the outer wall of its inner tube. The inner tubes are also preferably relatively thin so that good heat exchange may occur. As illustrated in Fig. 1, the heat exchange liquid passes substantially to the top of the outer tube before it overflows from the inner tube to pass downwardly through the outer tube. Due to the counter-current flow inside and outside the inner tubes heat exchange takes place and more nearly uniform temperature results throughout the length of each outer tube. Thus excessive heating or cooling of the outer tube at either its upper or lower portions is avoided. Since catalytic reactions are generally quite sensitive to temperature changes, the entire arrangement described insures more nearly uniform temperatures throughout the catalytic mass so that all portions thereof contribute as equally as possible to promoting the catalytic reaction, and during the regeneration process are substantially uniformly regenerated. In carrying out the process the heat exchange liquid within the diamond tubes is preheated and used to heat the catalytic mass during the on-stream periods and is used to cool the catalytic mass during the regeneration periods. By suitable circulation between various catalytic chambers at different portions of their cycles, it will be obvious that proper heating and cooling may be efficiently carried out. For example, the hot liquid passing from a chamber in which regeneration is occurring may be used to heat the catalytic mass in a chamber in which cracking is taking place.

Since there is some permissible variation in temperature it is possible to secure acceptable results without the use of circulating heat exchange liquid. The use of solid diamond heat exchange members as indicated in Fig. 5 is thus feasible. These heat exchange members may be incorporated in a catalyst case generally similar to that heretofore described with the exception that it may be considerably simplified by the omission of provisions for circulating heat exchange liquid.

The solid diamond-shaped bars 70 may be arranged as indicated in Fig. 5 generally similarly to the tubes indicated in Fig. 3. Surfaces A' and regions B' and C' are indicated in Fig. 5 to correspond to the surfaces A and regions B and C of Fig. 3. As in the case of the previous modification, only in the regions C' are there any portions of catalyst which are spaced from a heat exchange element 70 by more than half the distance from the heat exchange elements. Flow in smooth fashion and with avoidance of dead spaces occurs in the case of the arrangement of Fig. 5 just as in the case of that of Fig. 3.

In the portion of the arrangement of Fig. 5, assuming that the regeneration period of a cycle is beginning the temperature of the catalytic mass and of the bars 70 will be a minimum. With the introduction of air for regeneration purposes oxidation takes place and the temperature rises due to the generation of heat. The total heat generated, however, is taken up first by increase of temperature of the gas, which passes out in a hot condition, secondly by increase in temperature of the catalytic mass, and thirdly to a very large degree by increase in temperature of the massive rods 70. Whereas without the presence of the rods the temperature of the catalytic mass might rise to such extent as to damage the catalyst, the capacity for heat absorption of the rods 70 will keep the average temperature down provided that the rods are provided in sufficient number to absorb the heat generated without excessive temperature rise. This, if the on-stream cycle is extremely long as to cause the deposition of excessive amounts of carbon, may necessitate the provision of a relatively large number of rods closely spaced so that their total weight may be large compared with the weight of the catalyst. Under moderate conditions, however, regeneration may be effected without excessive temperature rise if proportions about as illustrated in Fig. 5 are adopted.

During the succeeding on-stream cycle, the endothermic reaction which takes place tends to cool the catalyst. Heat is then imparted from the hot bars 70 to the catalyst to maintain the temperature sufficiently high for the catalytic reaction. By suitable proportioning of the mass of the bars to the catalyst, the temperature throughout the cycle may be caused to remain within limits, the upper limit of which is the temperature which might adversely affect the catalyst and the lower limit of which is the minimum temperature consistent with proper catalytic operation. By avoiding long on-stream periods which, of course, means correspondingly short regeneration periods, the temperature variations may be kept within satisfactory bounds.

From the foregoing description of the invention it is readily apparent that by using hollow or solid heat transfer elements which are elongate or diamond shape in horizontal cross-section, and by arranging the heat transfer elements as indicated in the drawings, zones of catalyst are provided between adjacent rows of the heat transfer elements which permit an unrestricted flow of reactants thereacross so that the formation of dead spaces is prevented and all portions of the catalyst will enter into the reactions. Solid heat exchange elements or bars may be used alone for some alternate exothermic and endothermic reactions and their individual heat capacities and total number of elements necessary for controlling the temperature of the catalyst will be determined in accordance with the temperatures of each of the reactions so that during the exothermic reaction sufficient heat will be extracted to keep the catalyst temperature below that which would deleteriously affect the catalyst and at the same time enough heat would be stored in the solid elements to supply the endothermic heat of reaction. For other alternate exothermic and endothermic reactions the hollow tubes may be used to supplement the solid bars when it is necessary during the exothermic reaction to extract more heat in order to prevent injury to the catalyst than it is necessary to give up during the endothermic reaction. Under such circumstances the heat exchange fluid would be circulated through the hollow tubes at a rate sufficient to withdraw the excess heat while the remainder of the evolved heat would be stored in the solid elements for use during the endothermic period of the cycle. Or a low temperature fluid such as air may be circulated in direct heat exchange relation with the contact mass to supplement the solid bars during the exothermic reaction and particularly after the first or extreme period of the reaction to remove excess heat and prevent the catalyst from rising to a temperature which would cause injury thereto.

Referring now to Figs. 6 and 7 wherein the method of temperature control by the use of solid heat exchange elements is specifically applied to a cycle of operations involving the on-stream catalytic cracking of hydrocarbons and subsequent regeneration of carbonaceous deposit formed during the on-stream period. The invention in its broad aspects is applicable, however, to any cyclic operations involving alternate endothermic and exothermic reactions. Four converters L, M, N and O are used to illustrate the invention but it will be appreciated from the description of Figs. 6 and 7 that the converters may be arranged in any multiple of three or more in practicing the invention. With the present arrangement of four converters the cycle of operation will be as indicated in Fig. 7 with only one converter on stream at one time while one is being conditioned just prior to its going on stream and of the remaining two converters, one will be in the initial stage of regeneration and the other will be in the final stage of regeneration. Reactants are supplied to any of the converters as indicated in Fig. 6 through a manifold duct 60 and reaction products are led away from any of the converters through a manifold 61. For example, when converter M is on stream valves $V_2$ and $V_4$, which are in communication with this converter, would be open as indicated by the squares around these valves while the remaining valves $V_1$, $V_3$, $V_5$ and $V_6$ in communication with this converter would be closed. Converter N at this time will have been regenerated and will be undergoing a conditioning step or purging to remove any entrained air which may be done by passing steam through the converter or, as indicated, by a vacuum purge and valve $V_1$ to this converter will be open and any entrained products will pass to manifold duct 62. Converter O at this time will be undergoing regeneration cooling or a cooling of the converter after the deposit from a previous on-stream period had been removed by regeneration oxidation wherein heat was evolved, part of which was stored in the solid heat exchange elements. Preferably the solid elements would be of sufficient size or weight that sufficient of the evolved heat would be stored therein to limit the temperature rise of the converter to around 100° F. and not more than 150° F. Valves V3 and V6, which are in communication with this converter, will be open at this period while the other valves are closed and cooling air at a temperature of between 350° and 450° F. will be supplied to manifold 63 after being compressed in compressor C by motor generator M and the cooling air will leave this converter at a temperature around 750° F. after taking up heat from the converter and will pass to manifold duct 64 in sufficiently heated condition to effect regeneration oxidation in converter L, which has just been on stream, in order to remove the carbonaceous deposit. At this time valves V3 and V5 to converter L will be open with the remaining valves closed and the heated regeneration air will start the regeneration in converter L and regeneration fumes pass through valve V5 at a temperature of 900° F. or somewhat above to manifold duct 65 and thence to a turbine T in order to supply sufficient energy to effect further compression of air incoming through manifold duct 63 or the regeneration fumes may go to a steam accumulator. Valve V7 is provided between manifold duct 63 and duct 65 to permit by-passing some of the incoming air directly to the turbine T in order to reduce or regulate the amount of air going to a converter in accordance with the amount of carbonaceous material deposited and hence assist in regulating the temperature of the converter. Referring to Fig. 7, the cycle of operation outlined above would take place between the 15 and 20 minute periods of the operation cycle, after which the converter N which will have been purged will be ready to go on stream between the 20 and 30 minute period of the cycle and the converters O, L and M would continue their respective steps of treatment to advance them in sequence toward a subsequent on-stream period as is clearly indicated in the chart of the operation cycle in Fig. 7. As indicated on the chart in connection with converter L, a complete cycle of operation for a 40 minute cycle will be as follows:

```
                                          Minutes
S—On-stream period_____ 10
VO—Oil evacuation or purge_____  5
RO—Regeneration by oxidation_____ 10
RC—Regeneration by cooling_____ 10
VA—Air evacuation or purge_____  5
```

The same type or cycle of operation is employed for each of the converters of the unit. The cycles may be of any desired length, such for example as 30 minutes or less and up to two hours or more. The length of the on-stream period will always be some fraction of the total length of the cycle, for example, ½, ⅓, ¼ more or less of the cycle depending on the number of converters in the unit and depending on the time necessary for the regeneration oxidation period which will be dependent upon the particular fluid being treated, the contact material employed and various other factors.

The arrangement and heat capacities of the solid heat exchange elements as heretofore stated may be such as to limit the temperature rise of the converter to any desired degree during the oxidation or burning period of the cycle and to store sufficient heat during this period to supply the subsequent on-stream period of the cycle without necessitating heat supply from any other source while the utilization of a relatively low temperature fluid, such as air at around 350° F., in direct heat exchange relation with the contact material permits the converter to be brought rapidly down to the required temperature to begin the on-stream period of the cycle and at the same time eliminates the use of a separate heat exchange fluid system. Also the cooling air in passing through the contact material which has been regenerated by oxidation is heated sufficiently to begin the oxidation in another converter without necessitating the use of other equipment to effect its heating.

This application is a continuation-in-part of abandoned application Serial No. 248,193, filed December 29, 1938, in the name of L. W. T. Cummings for Heat transfer method and apparatus.

What I claim is:

In a cyclic process involving a plurality of converters each containing a body of contact material and used on stream to obtain the desired product and alternately therewith in regeneration to remove from the contact material contaminants formed during the on stream period, the steps of operation which comprise supplying reactants to a converter maintained within a predetermined temperature range to effect the on stream reaction, supplying reactants to a second converter which has been on stream in order to effect the regeneration reaction, during the regeneration in the second converter storing a portion of the heat evolved in zones having a higher heat capacity per unit volume than the contact material, removing from said second converter after the regeneration has been completed heat in excess of that required for a succeeding on stream reaction by passing an oxygen containing gas in cool condition therethrough in direct heat exchange relationship with the contact material, removing the oxygen containing gas from the said second converter in heated condition and supplying it to a converter in which the on stream reaction is completed for passage therethrough in direct contact with the contact material therein in order to raise the temperature and initiate the regeneration reaction.

LELAND W. T. CUMMINGS.

REFERENCES CITED

The following references are of record in the file of this patent:

UNITED STATES PATENTS

| Number | Name | Date |
|---|---|---|
| 1,351,859 | Lowe | Sept. 7, 1920 |
| 1,894,768 | Hechenbleikner | Jan. 17, 1933 |
| 1,893,372 | Kryzanowsky | Jan. 3, 1933 |
| 2,161,676 | Houdry | June 6, 1939 |
| 2,073,638 | Houdry | Mar. 16, 1937 |
| 2,205,409 | Houdry | June 25, 1940 |
| 2,312,006 | Thiele | Feb. 23, 1943 |
| 2,223,162 | Benedict | Nov. 26, 1940 |
| 2,298,399 | McAfee | Oct. 13, 1942 |

FOREIGN PATENTS

| Number | Country | Date |
|---|---|---|
| 784,885 | France | July 27, 1935 |